Oct. 27, 1970  H. B. MITCHELL  3,535,870
PARKING METER CONTROLLER
Filed June 9, 1969  2 Sheets-Sheet 1
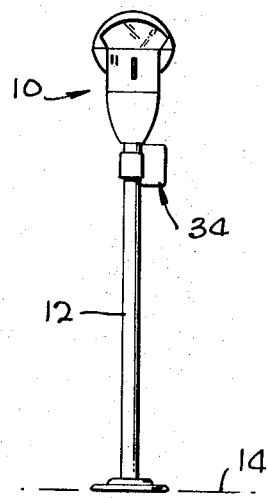
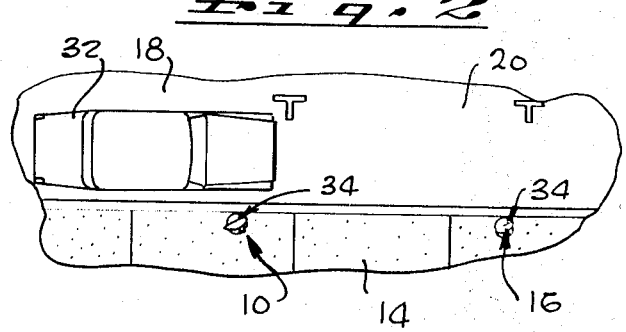
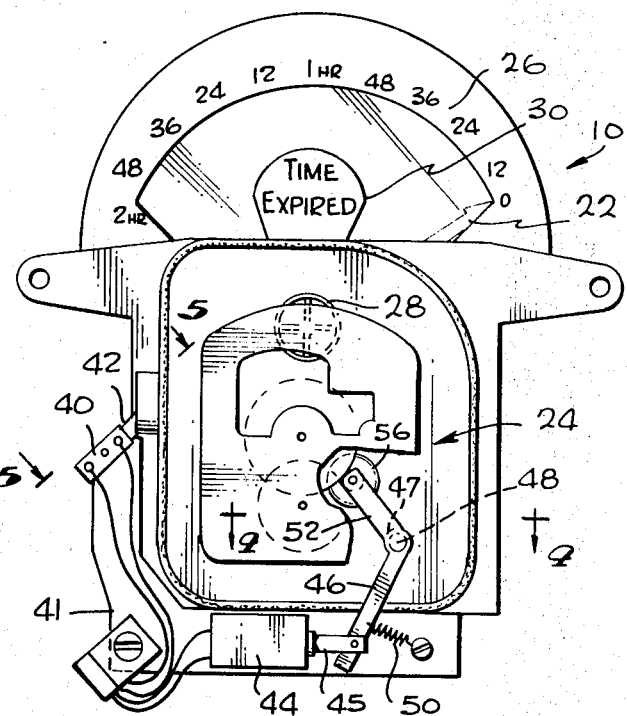
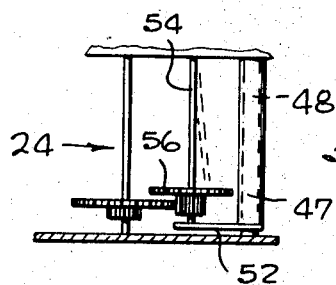
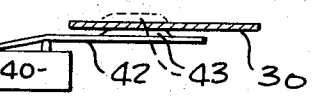
INVENTOR.
HAROLD B. MITCHELL
BY Allan M. Shapiro
ATTORNEY

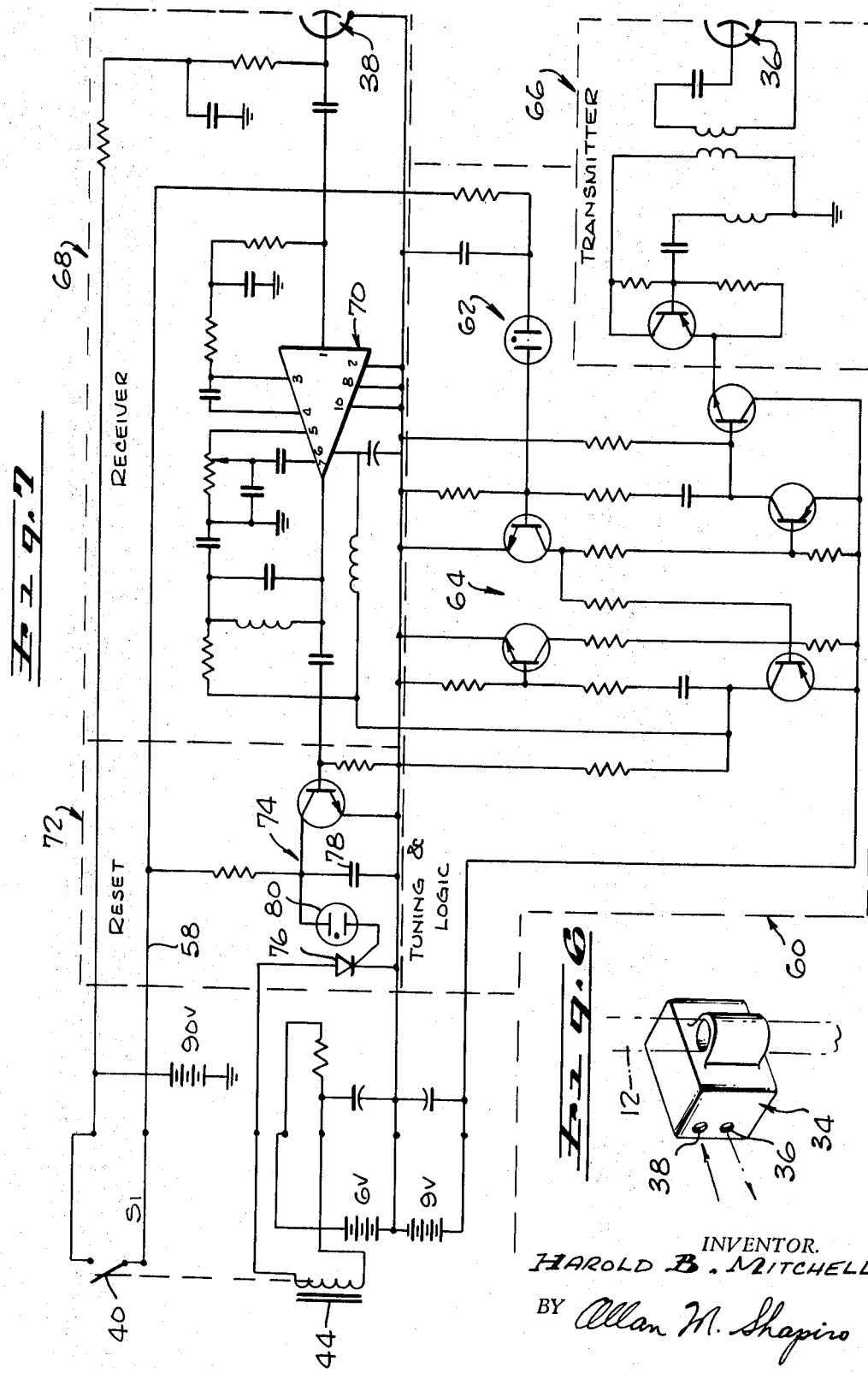

United States Patent Office 3,535,870
Patented Oct. 27, 1970

3,535,870
PARKING METER CONTROLLER
Harold B. Mitchell, Los Angeles, Calif., assignor to Soniclear, Inc., Van Nuys, Calif., a corporation of California
Filed June 9, 1969, Ser. No. 831,566
Int. Cl. G07c 1/30
U.S. Cl. 58—142      13 Claims

ABSTRACT OF THE DISCLOSURE

A controller attached to a standard parking meter for returning the parking meter to zero upon departure of a vehicle from the space which the parking meter controls. The controller comprises an ultrasonic transmitter which emits periodic bursts of directional ultrasonic energy during the active timing period of the meter, and an ultrasonic receiver for receiving ultrasonic energy reflected from a vehicle occupying the controlled space. Upon removal of the vehicle and subsequent absence of reflections, the meter is acted upon to return to zero. A controller is disclosed which is coupled to the meter in a manner such that the controller is activated by commencement of meter operation, and is deactivated by the meter when the controller turns off the meter.

BACKGROUND OF THE INVENTION

Field of the invention

This invention is directed to a controller for a parking meter, which controller returns the parking meter to zero in the absence of a vehicle in the controlled space.

Description of the prior art

Most city parking meter ordinances require that each operator of a vehicle entering a parking space place money in the meter, at least corresponding to the time that the vehicle will be in the metered, controlled space. In most such ordinances, it is illegal to enter a space where the meter has not timed out, and fail to put money in the meter.

There have been attempts in the prior art to implement the ordinance by returning the meter to zero upon the departure of the vericle from the controlled or metered space. The prior devices include a meter having a magnetic sensing device which detects the presence of a vehicle in the metered space. The system is unreliable because it can be disturbed by a great variety of electrical and magnetic signals found in cities and generated by power lines, and the like. By installing a complex integrating memory circuit, the reliability of magnetic systems can be improved, but the cost becomes prohibitive. Additionally, a magnetic system is easily made ineffective by the presence of a magnet in the vicinity of the magnetic sensing elements.

Another prior class of sensing device for employment with parking meters is one which employs a photoelectric cell. This class is divided into two groups. One group transmits a beam to a photocell, and the beam is broken by the vehicle. This necessitates a light source away from the meter. The other group comprises a passive system which is dependent upon incident light being blocked by the vehicle as it is parked in the controlled space. Either group of photocell systems is easily made inoperable by ice or dirt obstructing the photocell or light source. The passive system must operate over a very large range of light, and thus a complex sensing system need be devised to circumvent this difficulty. Photocell systems are also subject to derangement by covering the photocell, or by the employment of a flashlight to make the meters register vacant. In still another class of parking meters, pressure sensitive switches are embedded in the pavement. Of course, such are expensive to install and subject to fairly high maintenance.

The prior art also includes an ultrasonic transmitter which directs a signal at the pavement in the controlled parking space, together with a receiving transducer which detects the echo. The receiving transducer is coupled to logic which distinguishes between the pavement echo signal and the echo signal received from a vehicle parking in the space. The logic must be sensitive and accurate, particularly when vehicles of many different types and thus different ultrasonic reflectivities can occupy such a parking space. Furthermore, such a system must be continuously operative for, by its very nature, it generates ultrasonic signals toward the pavement when the parking space is unoccupied. Accordingly, since it is in operation 24 hours a day, it must be connected to a power supply because normal batteries do not have sufficient lifespan to operate such a system for an adequate life.

SUMMARY OF THE INVENTION

In order to aid in the understanding of this invention, it can be stated in essentially summary form that it is directed to a parking meter controller. The parking meter controller is energized when a standard parking meter is unexpired, so that an ultrasonic transmitter means periodically directs ultrasonic bursts horizontally toward the controlled space. Upon receipt of an echo by receiver means, indicating a parked vehicle, the operation continues. However, when the ultrasonic receiving means does not receive an echo after a plurality of such bursts, reset means is actuated to return the parking meter to zero to thus also turn off the parking meter controller.

Accordingly, it is an object of this invention to provide a parking meter controller which returns the parking meter to zero when no vehicle is present in the controlled space, and to turn off the parking meter controller at the same time. It is a further object to provide a parking meter controller which is energized upon actuation of a parking meter by the placement of money therein, so that the parking meter controller is only operative during those times when it is needed, and thus it is low in power consumption and can be battery operated with a reasonable battery life. It is another object to provide a parking meter controller wherein periodic bursts of ultrasonic energy are directed into the controlled space, and receiver means prevents return of the meter to zero until a plurality of bursts are transmitted without reception of corresponding echo signals.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a side elevational view of a conventional parking meter showing the parking meter controller of this invention attached thereto.

FIG. 2 is a top plan view of two such parking meters, together with the associated controlled parking spaces and the adjacent sidewalk in a conventional arrangement.

FIG. 3 is an enlarged, side elevational view of the parking meter, with the cover removed, showing a portion of the reset mechanism.

FIG. 4 is a fragmentary section taken generally along the line 4—4 of FIG. 3, further illustrating operation of the reset mechanism.

FIG. 5 is a section taken generally along the line 5—5 of FIG. 3, illustrating means for activating the controller.

FIG. 6 is a perspective view showing the housing for the ultrasonic unit and the electronics of the controller, as attached to a parking meter post.

FIG. 7 is a schematic illustration of the electronics of the parking meter controller.

DESCRIPTION OF THE PREFERRED EMBODIMENT

Referring to the drawings, a conventional parking meter is generally indicated at 10. Parking meter 10 can be any convenient and conventional type such as, for example, a Duncan-Miller Meter manufactured by Duncan Parking Meter Corporation, Chicago, Ill., and illustrated in the drawings for convenience of description. As can be seen in FIG. 1, parking meter 10 is mounted upon post 12 so that the meter is supported above sidewalk 14. As seen in FIG. 2, meter 10 and an adjacent meter 16 are mounted at the edge of the curb in association with parking spaces 18 and 20 which conventionally are delineated as by lines on a pavement. Parking spaces 18 and 20 may be parallel to the curb, as shown, or at a conventional acute or 90° angle.

As is well known, conventional parking meters, such as parking meter 10, have a clock mechanism with a clock hand 22 which moves with one of the slow speed shafts of the clock escapement, indicated generally at 24. The speed at which the clock hand moves with respect to its face 26 is controlled by escapement wheel 28. The slow speed shaft carrying clock hand 22, or one of the adjacent shafts, carries the cam which controls indicia member 30, which pops up when the clock hand 22 times out to zero time. When a driver parks his vehicle 32 in space 18, he sees that space 18 is controlled by meter 10. As soon as he is parked, he goes to the meter and, estimating the amount of time his vehicle will remain parked in that space, he inserts appropriate coinage into the coin acceptor slot of the meter. Thereupon, he turns the handle of the meter. This last step causes acceptance of the coin and causes clock hand 22 to move up the scale of face 26 an amount of time in accordance with the amount of coinage placed in the coin acceptor slot. With the clock hand 22 registering a time above zero, indicia member 30 is pivotally retracted or rotated by its cam. The turning of the handle performs one additional and important function, i.e., causes winding of the mainspring so that escapement wheel 28 is powered and clock hand 22 times out at zero after the appropriate time.

With the conventional, standard parking meter 10, should the driver have overestimated his time, he may depart with his vehicle 32 while there is still time before the meter times out. Another driver could park his vehicle in the space 18 for the balance of the time on the meter without paying for that time. Most city ordinances require that each vehicle parked pay for its own time of occupancy of the parking space. Accordingly, it is illegal to park in a space with a meter which has not timed out, without putting appropriate coinage into the meter for the new vehicle's stay, but police enforcement of the ordinance is practically impossible when unexpired clock time prevents pop-up of the "flag" or indicia member 30.

Controller 34 of this invention, as seen in FIGS. 1 and 6, is mounted upon post 12, directly below the meter 10, and is connected to meter 10. Controller 34 comprises a housing in which ultrasonic transmitter transducer 36 and receiver transducer 38 are mounted. Additionally, the batteries and control electronics illustrated in FIG. 7 are principally housed in the controller housing. However, two functions must be directly related to the clock mechanism within the meter, namely, actuation of the controller by the meter and the converse zero reset of the meter by the controller, and thus exemplary means for accomplishing these functions are described hereinafter. First of all, as is illustrated in FIGS. 3, 4 and 5, switch 40 is mounted upon bracket 41 in direct relationship to the meter-timing mechanism, preferably beneath one of the outer covers of the meter. Switch 40 is operated by indicia member 30, or one of the links and levers in association therewith, so that switch 40 is open when indicia member 30 is in a raised position shown in FIG. 3. As seen in FIG. 5, switch 40 may be of the microswitch type having normally open contacts and provided with a leaf spring 42 having a cam portion 43 normally resting, as seen in broken lines, in the path of member 30 so as to be deflected into actuation position, as seen in solid lines, relative to switch 40. Thus, switch 40 is open whenever the escapement is timed out and clock hand 22 shows zero time.

The other means mounted in association with the timing mechanism includes a solenoid 44, which is also mounted on bracket 41. The armature 45 of solenoid 44 is connected to arm 46 with a lost-motion pivoted connection. Arm 46 is fixed to sleeve 47, which is tubular and rotatably mounted on one of the posts 48 in the clockwork mechanism. Spring 50 urges arm 46 in a counterclockwise direction about post 48 and urges armature 45 outwardly. Lever 52 is fixed to sleeve 47, and rotatably carries in its end the pivot pin of clockwork shaft 54. Shaft 54 carries gear and pinion 56 on its end adjacent lever 52 so that, when lever 52 is urged in the counterclockwise direction by the force of spring 48 the gear and pinion are engaged with appropriate members in the clockwork mechanism so that the clockwork mechanism operates in a conventional way. However, when solenoid 44 is energized, armature 45 is retracted for causing arm 46 and lever 52 to rotate in a clockwise direction, as is seen in FIG. 3, so that gear and pinion 56 are moved out of engagement with their mating parts in the clockwork mechanism. Thus, the clockwork mechanism is disconnected between the main spring and the escapement wheel 28. Under its own force, the main spring and the slow speed shafts moving with it, up to but not including gear and pinion 56, immediately unwind to return clock hand 22 to the zero time position and raise indicia member 30 to the position as shown in FIG. 3. Simultaneously, as seen in FIG. 5, member 30 releases leaf spring 42 so that switch 40 is opened. Thus, actuation of solenoid 44 causes reset of the clockhand to the zero time position, irrespective of the amount or unexpired time just previously shown on the meter face, and deactivation of the circuitry to be described. The circuitry of FIG. 7, which is primarily housed in controller housing 34, conversely controls the energization of solenoid 44.

Referring particularly to FIG. 7, closure of switch 40 energizes line 58 which energizes a tuning and logic circuit indicated generally at 60. Logic circuit 60 includes a neon light relaxation oscillator indicated at 62, which acts as a timer, and two one-shot multivibrators, generally indicated at 64. The function of logic circuit 60 is to periodically energize a transmitter circuit indicated generally at 66. Thus, at convenient intervals such as, for example, six times a minute, transmitter circuit 66 is energized. Transmitter circuit 66 comprises an oscillator and, each time it is energized, appropriately drives transmitter transducer 36 to produce a short burst of ultrasonic energy. This energy is directed toward vehicle 32 in the parking space and, due to the presence of the vehicle, an echo of reflected ultrasonic energy is received by receiving transducer 38 which is connected to a receiver circuit 68.

The receiver circuit 68 includes an operational amplifier, indicated conventionally at 70, which is connected to amplify the echo signal. One of the multivibrators 64 is connected to cause transmitter energization for a short period, and the other multivibrator is connected to the operational amplifier 70 so that the amplifier will be operational only when an echo is expected.

The output of receiver circuit 68 is connected to a reset circuit indicated generally at 72. The reset circuit 72 illustrated is a delayed action switch which is formed by the combination of a neon light relaxation oscillator indicated generally at 74 and a silicon-controlled rectifier 76. The capacitor 78 in the oscillator 74 is discharged each time an ultrasonic pulse is received by the echo amplifier. If no pulse is received after approximately three bursts from the transmitter 66, capacitor 78 continues to charge until its voltage is sufficient to fire a neon light 80 which triggers the silicon-controlled rectifier 76 into conduction. The silicon-controlled rectifier then conducts heavily through the coil of solenoid 44 to cause it to be actuated. As previously described, when actuated, solenoid 44 mechanically disconnects the clock mechanism to permit the return of the meter clockworks to the zero time position and thus open switch 40. Thus, except for negligible leakage current, all power consumption is eliminated except when the meter is actually timing. Thus, with relatively small batteries, a long life factor is accomplished. Both the transmitting and receiving transducers 36 and 38 are preferably electrostatic devices, which thus use a minimum of power for short ultrasonic bursts to prolong battery life.

While particular circuitry has been illustrated and functionally described, it is clear to those skilled in the art that conventional circuitry having a similar function can be employed.

This invention having been described in its preferred embodiment, it is clear that it is susceptible to numerous modifications and embodiments within the ability of those skilled in the art and without the exercise of the inventive faculty.

What is claimed is:

1. A parking meter controller for connection to a parking meter adjacent a space occupiable by a vehicle, said meter having a member movable from a timing position to a time expired position, said parking meter controller comprising:
    a switch movable to an actuated position when the movable member in the parking meter is in a timing position;
    reset means actuatable to permit the movable member to move from its timing position to its time-expired position; and
    sonic sensing means in said parking meter controller, said sonic sensing means being directed horizontally toward said space, said sonic sensing means being connected to be energized by actuation of said switch for sonically determining the presence of a vehicle adjacent said parking meter controller and occupying said space, said sonic sensing means being connected to said reset means so that, upon determination by said sonic sensing means of the absence of a vehicle adjacent said parking meter controller, said reset means is actuated to permit the movable member to move to its time-expired position.

2. The parking meter controller of claim 1 wherein said sonic sensing means comprises transmitter means and receiver means, said transmitter means and said receiver means being energized only when said switch is actuated.

3. The parking meter controller of claim 2 wherein logic means is connected to said transmitter means and to said receiver means, said logic means periodically actuating said receiver means and periodically actuating said transmitter means while said receiver mean is actuated.

4. The parking meter controller of claim 3 wherein said receiver means is connected to said reset means so that said reset means is actuated after said receiver means fails to receive a reflected sonic signal.

5. The parking meter controller of claim 4 wherein said reset means comprises a solenoid, a battery and reset switch means connected in series with each other so that, upon closing of said reset switch means, said solenoid is actuated.

6. The parking meter controller of claim 5 wherein said reset switch means is maintained open until a plurality of successive sonic bursts by said transmitter means have no corresponding reflections from a vehicle as determined by said receiver means.

7. The parking meter controller of claim 1 wherein said controller is mounted in a controller housing, said controller housing being mountable upon the post of a standard parking meter adjacent the standard parking meter.

8. The parking meter controller of claim 7 wherein a controller bracket is mountable within said standard parking meter, said controller bracket carrying said switch means and said reset means.

9. The parking meter controller of claim 8 wherein said parking meter includes a clock gear train, and
    said reset means comprises a pinion shaft movable out of engagement with said clock gear train and motive means to move said pinion shaft to permit the movable member in the parking meter to move to the time-expired position.

10. The parking meter controller of claim 9 wherein said motive means is a solenoid.

11. The parking meter controller of claim 7 wherein said controller sonic means includes separate transmitter means and receiver means, said transmitter means periodically emitting sonic bursts when said switch is actuated by said movable member.

12. The parking meter controller of claim 11 wherein logic means is connected to periodically turn on said receiver during the period when said switch is actuated and to periodically cause said transmitter means to emit bursts of sonic energy while said receiver means is energized.

13. The parking meter controller of claim 12 wherein said receiver is connected to said reset means to actuate said reset means after said receiver means fails to receive the echo of a plurality of sonic bursts emitted by said transmitter means.

References Cited

UNITED STATES PATENTS 3,166,732   1/1965   Jungman et al. _____ 58—142

RICHARD B. WILKINSON, Primary Examiner

E. C. SIMMONS, Assistant Examiner

Notice of Adverse Decision in Interference

In Interference No. 98,629 involving Patent No. 3,535,870, H. B. Michell, PARKING METER CONTROLLER, final judgment adverse to the patentee was rendered Nov. 29, 1974, as to claims 1–6 and 11–13.

[*Official Gazette February 18, 1975.*]